United States Patent [19]

Karpa

[11] Patent Number: 4,765,423
[45] Date of Patent: Aug. 23, 1988

[54] LOAD CELL ADAPTOR

[76] Inventor: Michael J. Karpa, P.O. Box 408, Stn. B, Hamilton, Canada, L8L 7W2

[21] Appl. No.: 117,637

[22] Filed: Nov. 5, 1987

[51] Int. Cl.[4] .................. G01G 3/14; G01G 21/24; G01L 1/22
[52] U.S. Cl. .................. 177/211; 177/255; 73/862.65
[58] Field of Search .......... 177/211, 255, 128; 73/862.64–862.66

[56] References Cited

U.S. PATENT DOCUMENTS

| | | | |
|---|---|---|---|
| 3,512,595 | 5/1970 | Laimins | 73/862.65 |
| 3,934,465 | 1/1976 | Hanson | 73/862.39 |
| 3,997,014 | 12/1976 | Soderholm et al. | 177/128 |
| 4,248,317 | 2/1981 | Rahav | 177/134 |
| 4,339,010 | 7/1982 | Malikov et al. | 177/255 X |
| 4,658,923 | 4/1987 | Labarile | 177/255 |

Primary Examiner—George H. Miller, Jr.

[57] ABSTRACT

This invention relates to the design and construction of an adaptor for load cells with through loading holes (primarily cylindrical or doughnut type) used in multiple cell applications (scales); it provides lateral stops and anti-tipping control for the associated load receptacles; it features options for total overload protection, shock or vibrational force transmissibility reduction and lateral force reduction techniques for cell performance improvement.

6 Claims, 4 Drawing Sheets

LOAD CELL ADAPTOR

This invention relates to the design and construction of a device to adapt load cells (primarily ring or doughnut type) to load receptacles or carriers, platforms, hoppers and tanks, etc. so that the resultant weight scale has good accuracy, accommodates adverse environmental influences and is relatively inexpensive to manufacture and install.

In constructing electronic scales using several supporting load cells it is well known to the art that the mounting of a relatively rigid load receptacle (which rests on the load cells and carries the material-to-be-weighed) on such fixed support points will always introduce side forces on the load cells. Side forces on load cells in such a multiple cell supported arrangement can come from a number of sources; the application of the object-to-be-weighed (vehicle entry, for example), structural expansion (and contraction) with temperature, structural deflection due to loading, cambering or creep of support components, etc. Side forces on load cells are undesirable as they can damage the load cells, produce errors in cell performance or require expensive cell adaptation detailing to reduce side force magnitude or use of costly load cell which are specially designed to accommodate side forces with insignificant errors of weighing.

A wide variety of load cell adaptation systems and even commercially available adaptors have been used between cells and their scale structure to accommodate or reduce these deleterious side forces. Sliding, rolling, rocking, tilting, etc. load cell support or suspension details have been used with and without the cooperation of check or stay rods. Practically any of the above solutions can be worked out for any given cell with its particular sensitivity to side forces; however all solutions are relatively expensive amounting to an added cost of about 50% or so of the cost of the load cell to get a properly functioning support detail. If we, furthermore, wish to incorporate details such as very low side force (low friction in its sliding element) for extreme precision, high overload capability (500% or so), shock absorbing capability (for impact loads) and reduced force transmissibility (problem with vibrating and moving loads like live animal scales), we find that the cell adaptation detailing very rapidly escalates in cost.

The adaptor device according to this invention offers a solution to all the aforementioned problems by using a very simple and inexpensive load cell adaptation system. Not only does it reduce side forces to acceptable limits but it can easily be modified to change the magnitude of side force (and hence the associated error), to accommodate virtually any overload, to accommodate all load application related side forces, to accommodate impact and shock loading and to reduce the transmissibility of load recepticle dynamic or forced forces to the foundation and to the load cell itself.

Unfortunately precision load cells of the ring or doughnut type are not now manufactured, the reason is that they are perhaps 10% or so more expensive than precision cylindrical cells with no hole. What is overlooked is that the 10% extra for the construction of such a cell would save at least 3 or 4 times this figure in installed cost because an inexpensive and versatile adaptor according to this invention could then be used.

SUMMARY OF THE INVENTION

The adaptor device according to this invention requires a load cell with a through hole and in the preferred embodiment having a cylindrical or circular construction. The cell rests on a base plate (to which it is normally bolted) which has a central hole; this base plate in turn sits on two supporting blocks with a central space inbetween. Passing through the load cell and base holes is a high strength bolt with a spherical washer assembly under its head and working against the load cell. Suspended from the bottom of this bolt is a loading bar with a hole through its center and located between the two base plate support blocks; between this loading bar and the bolt lower nut is a spherical washer assembly similar to the one at the other bolt end.

By placing the load on the two loading bar ends we can move the bar in any lateral direction and twist it along its short or long axis without developing a side force magnitude such that the load cell cannot accommodate without affecting its normal accuracy. The clearance between the base plate support blocks can be set so that horizontal side forces due to load bumping (during scale loading) can be harmlessly shunted to the foundation. The clearance between the loading bar top and the base plate plate can be set so that when scale tipping is encountered (as wind on outdoor tank scales) the loading bar hits the base plate providing a righting moment.

Further refinements can very easily be effected in the above arrangement to accommodate other application requirements. To accommodate a large scale overload a preloaded package of springs can be located between the bolt head and its washer assembly; this package is normally dormant below the preset threshold but when an overload occurs the spring package collapses causing the loading bar to hit the foundation thereby shunting out this overload force from the load cell. If the application problem has to do with sudden (or sustained) impact or vibrational shock loading rather than a slow massive overload we can replace the spring package with a package or sandwich of force damping or isolating material (rubber, syntetic fibre, cork, felt, etc.) engineered to reduce the force transmissibility from load recepticle to the foundation and load cells. Finally for load cells not being able to tolerate even small side forces or to improve the performance of other cells we can place a sheet of Nylon (or similar material) at the spherical faces of the spherical washer assemblies thereby reducing the effective side force on the load cell to an extremely small value.

DETAILED DESCRIPTION OF THE DRAWINGS

Referring now to the drawings wherein like reference numbers indicate like parts in the various views.

Figure 1:
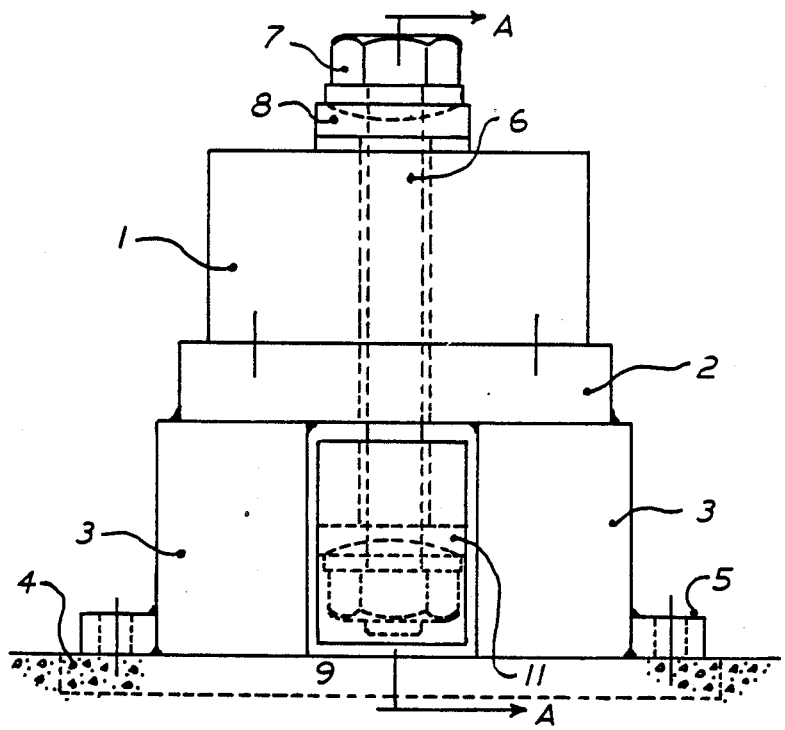
FIG. 1 is an elevation view of an adaptor device according to this invention.
Figure 2:
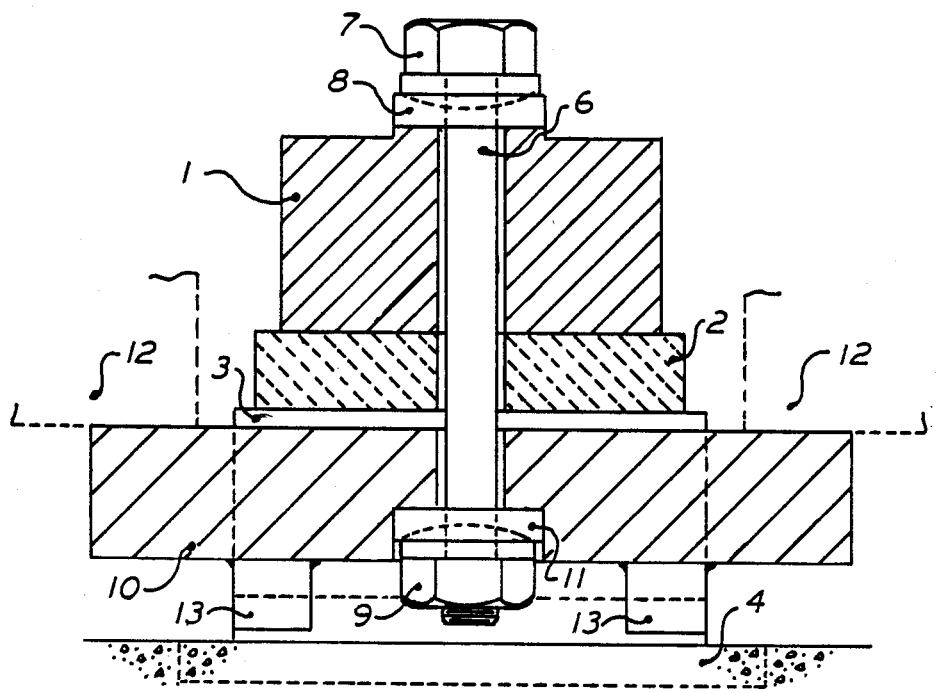
FIG. 2 is a sectional view along line A—A of FIG. 1.

In FIG. 1 and FIG. 2 we have a cylindrical or doughnut shaped load cell 1 having a hole through it mounted on a base plate 2 with a matching through hole. Said base plate 2 rests on and is normally welded to two spaced support blocks 3 which may be welded or bolted to a foundation sole plate 4 by lugs 5. Passing through the central holes of items 1 and 2 is a high strength bolt 6 which has its head 7 resting on a spherical washer assembly 8 which in turn rests on the load cell 1. The bottom end of the bolt 6 via its nut 9 supports a loading bar 10 with another similar but inverted spherical washer assembly 11. Said loading bar 10 picks up the load carrier or receptacle, generally designated 12, at its ends. The loading bar 10 may optionally have two stop blocks 13 fastened to it and located with clearance over the sole plate 4 with the only purpose of giving the load recepticle a small controlled drop should the bolt 6 fail. Also the width of the loading bar 10 is such compared to the spacing of blocks 3 so that all normal expansion, etc. can take place within the gaps but should an abnormal side force occur (e.g. trucks braking on a scale platform) this force would be harmlessly shunted to the foundation by bar 10 striking one of the blocks 3 depending on direction of application of said force.

Figure 3:
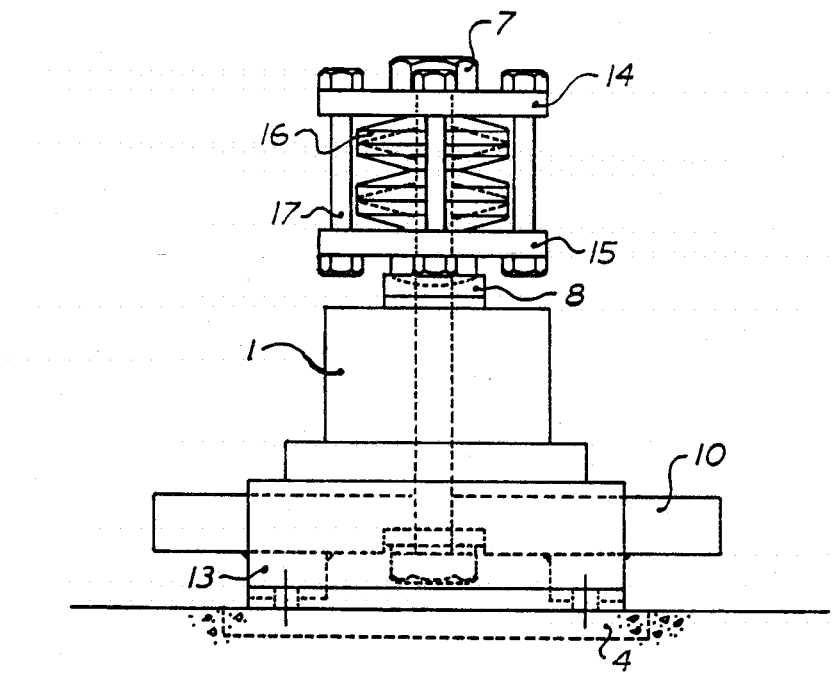
FIG. 3 shows the device incorporating an overload protection spring package.

FIG. 3 shows an adaptor and load cell 1 as already described except that between the bolt head 7 and the washer assembly 8 we have inserted a spring package so as to enable the system to accommodate massive overloads. The spring package is made up of an upper plate 14, a lower plate 15 (both plates with a central hole), a series of stacked disc or "Belleville" springs generally 16 and four bolts 17 holding the package together. The travel and force magnitude of a disc spring assembly can be adjusted by size, number and how we stack them (well known in this field); the best arrangement for each adaptor/cell size is established with standard springs. The idea is to assemble a package of springs 16 so that they can be preloaded by the bolts 17 to a force value in excess of the cell capacity but well under its safe overload point. When the overload occurs the spring package (which is normally dormant) collapses with the load resting on the loading bar 10 being shunted to the foundation plate 4 by the stop blocks 13 striking said plate 4.

Figure 4:
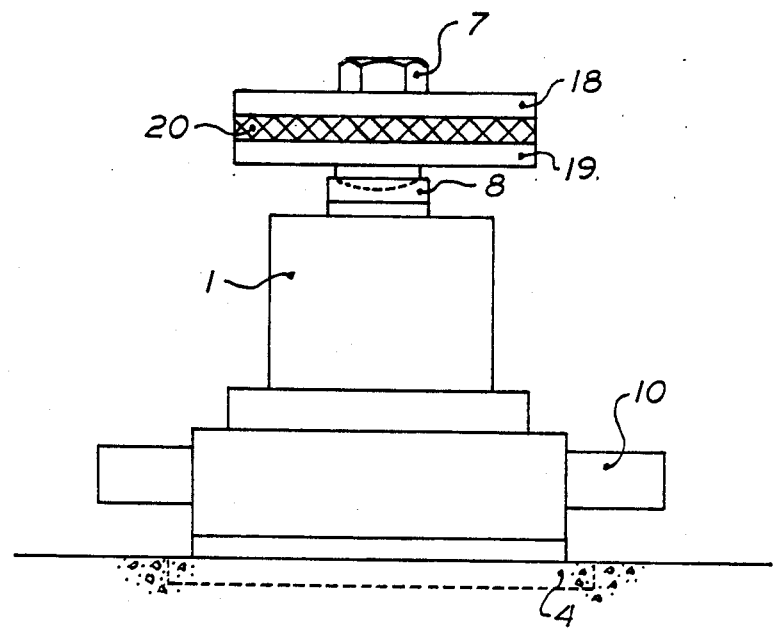
FIG. 4 shows the device incorporating a shock or vibrational force reducing sandwich.

FIG. 4 shows an adaptor and load cell 1 as already described except in this case we are concerned with not a massive overload but the dynamic force transmissibility between the load applied on bar 10 and both the load cell 1 and foundation represented by sole plate 4. Our problem may be that mounted on the load receptacle (which mounts on bar 10) we have shock loads (severe force spikes of short duration—like scrap metal parts being unloaded into a scale mounted hopper) or a forced vibration (like scale mounted hopper vibratory feeder) which cause load cells to fatigue fail with regularity. A sandwich is inserted in the weight supporting force line between the bolt nut 7 and washer assembly 8 and consists of an upper plate 18, lower plate 19 and a force isolating material 20 inbetween; said material is engineered for maximum efficiency in transmissibility reduction for a particular flexible mounting system. Materials such as rubber, elasomers, synthetic fibres, cork, felt, etc. of various composition, stiffness and overall thickness can be designed (as already practiced in this field) to yield the optimum solution for a particular application. Because of the simplicity in applying a material sample to this adaptor one can easily change materials as operating parameters change or experiment with various commercial products where theoretical analysis of natural, forced frequencies, etc. is difficult.

Figure 5:
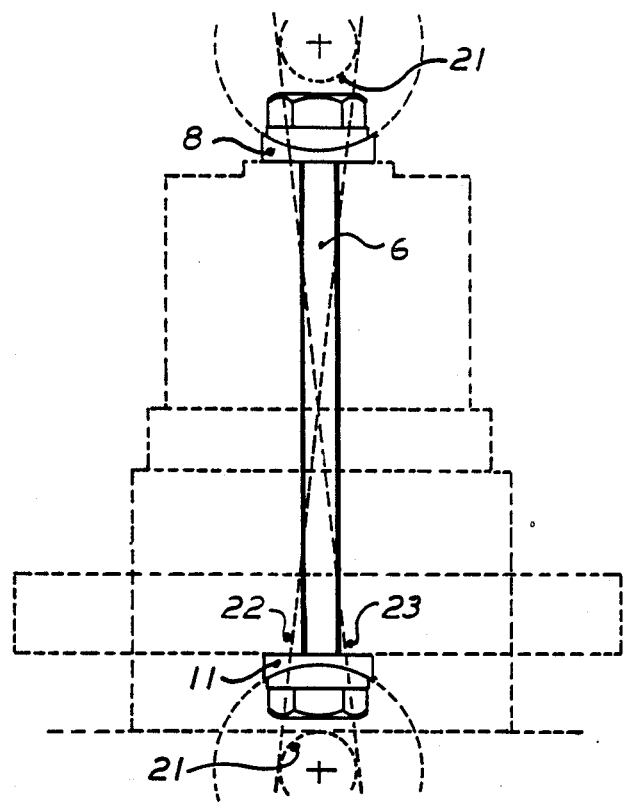
FIG. 5 shows the lateral force present due to normal scale action.

Another feature of this adaptor device relates to the fact that the side force inherent in multiple cell scale applications can be easily reduced by reducing the friction coefficient of the sliding faces in the 2 spherical washers in the suspension system. FIG. 5 shows a suspension bolt 6, the upper spherical washer 8, the lower spherical washer 11 and the rest of the adaptor/load cell arrangement being the same as before and is schematically shown in outline only. For an off-the-shelf washer (friction coef. approx. 0.2) a friction circle can be drawn as 21 at top and bottom (its dia. is washer sphere dia.×0.2) and from mechanics the outside limits of inclination of the reaction force are given by lines 22 and 23. The sine of this inclination angle is proportional to the load cell side force and resultant load cell output error; for a given side force this output error dedends on the cell type and its ability to reject it.

Figure 6:
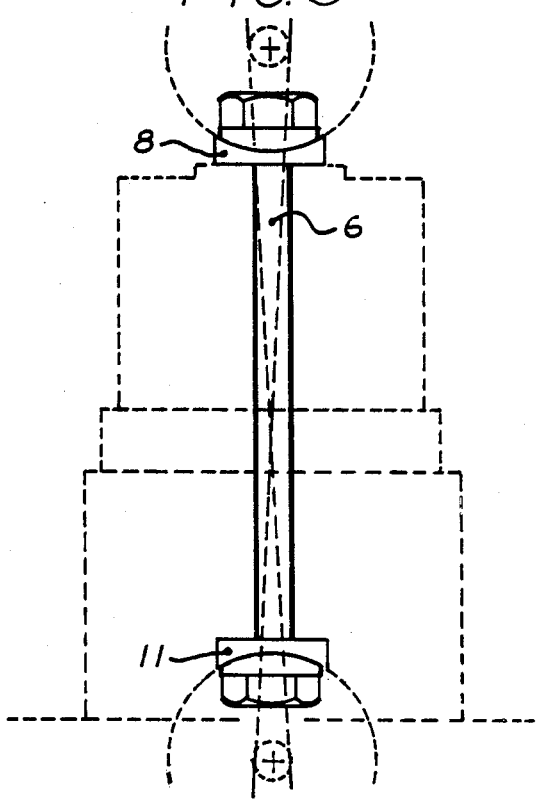
FIG. 6 shows the reduction of lateral force which occurs with reduction or sperical face friction.

In FIG. 6 we have the same system as in FIG. 5 except that the coefficient of friction of the sliding faces in the washers 8 and 11 have been reduced. This can be done by (a) inserting a thin sheet of low friction material (like Nylon, etc.) at the face surface (b) precision grinding (honing) of the face surfaces and use of special high pressure grease (c) hard surfacing one or both faces with special materials. Reduction of friction results in lower dia. friction circles, smaller angle of inclination, smaller side force on the cell and smaller error of the output reading. FIG. 6 illustrates the effect of a smaller friction circle. We thus have a very simple method for reducing the side force (and concomitant output error) in a given installation employing the subject adaptor.

Figure 7:
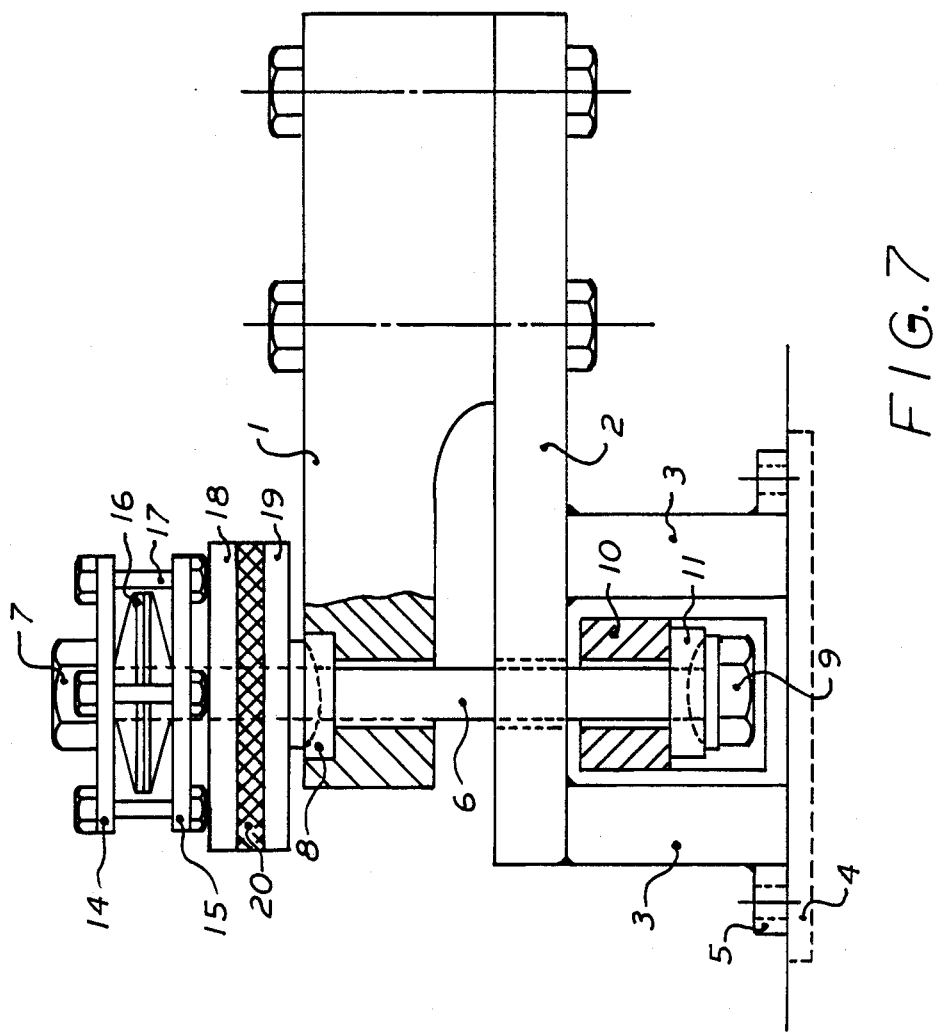
FIG. 7 shows a special adaptor for a shear beam cell incorporating both overload protection and shock reduction.

In FIG. 7 we have an adaptor essentially in keeping with the concept of this invention using a shear beam load cell 1 and employing both an overload protection spring package as shown in FIG. 3 and a vibrational shock absorbing sandwich shown in FIG. 4. The application could also employ side force reducing measures as described around FIGS. 6 and 7.

It should be noted that the adaptor with or without any of its options and regardless of the load cell type always has its loading bar captive in an inverted U configuration (two support blocks 3 on the sides, base plate 2 at the top and foundation plate 4 at the bottom). This provides the possibility of handling in a controlled way large horizontal forces and large overloads as already discussed in the detail drawings. Another feature which this adaptor always provides if the support blocks 3 are fastened to the foundation 4 is that should a tipping moment occur on the attached load receptacle or scale (wind on outdoor tanks, for example) resulting in an upward force on loading bar 10 the scale will always obtain an anti-tipping or righting moment when bar 10 strikes base 2. Control of this clearance dimension restricts the extent of this tipping movement to tolerable consequences.

What is claimed is:

1. A device for adapting load cells having a through loading hole to load receptacles or carriers in multiple cell support applications (known as electronic scales) and comprising the following elements:
   (a) a supporting base plate for the load cell having a coincident through hole and supported by two spaced blocks resting on and fastened to a foundation, (b) a suspension bolt passing through said cell and base holes and working against the load cell via a spherical washer assembly at its top and (c) said bolt supporting via a spherical washer assembly a loading bar at its bottom, said washer being deployed around a central through hole in said bar which in turn carries the applied load or scale structure at its ends.

2. A device of claim 1 but wherein the loading bar has its cross sectional dimensions accurately manufactured relative to the support block spacing and the foundation to base plate underside dimension so that normal horizontal movement can occur but abnormal horizontal forces are shunted via the support blocks to the foundation, vertical downward movement due to normal loading can occur but overloads are shunted to the foundation and any tipping of the applied load receptacle results in an upward loading bar movement and contact with base plate yielding an anti-tipping or righting moment to said load receptacle.

3. A device of claim 1 or 2 but wherein a preloaded spring package is inserted between the suspension bolt upper end and its load cell reacting spherical washer assembly so as to permit this package to collapse under overload allowing the loading bar to shunt this large force directly to the foundation.

4. A device of claim 1 or 2 but wherein a sandwich of two steel plates and force transmissibility reduction material (such as rubber, elasomer, syntetic fibre, cork, felt, etc.) inbetween is inserted between the suspension bolt upper end and its load cell reacting spherical washer assembly so as to reduce shock loads or forced vibrations being transmitted from the load receptacle to the load cell and the foundation.

5. A device of claim 1 or 2 but wherein special grinding or coating processes are applied to the sliding spherical faces or a separate low friction material is introduced at this face surface for both upper and lower spherical washer assemblies in order to reduce friction, resultant side force magnitude and associated error in the load cell's output signal.

6. A device of claim 1 or 2 wherein use is made of one or more of the following:
   (a) preloaded spring package
   (b) force transmissibility reduction sandwich
   (c) special processes or separate material insertion for the spherical washer sliding faces.

* * * * *